United States Patent
Hatch

[15] 3,672,211
[45] June 27, 1972

[54] ULTRASONIC SEARCH UNIT

[72] Inventor: Gordon H. Hatch, Brookfield, Conn.

[73] Assignee: Automation Industries, Inc., Century City, Calif.

[22] Filed: June 1, 1970

[21] Appl. No.: 42,076

[52] U.S. Cl. ............................................. 73/71.5, 310/8.7
[51] Int. Cl. ..................................................... G01n 29/04
[58] Field of Search ...................... 73/67.8, 67.9, 71.5, 67.5, 73/67.7; 310/8.7

[56] References Cited

UNITED STATES PATENTS

| | | | |
|---|---|---|---|
| 2,460,153 | 1/1949 | Smoluchowski | 310/8.7 |
| 3,121,325 | 2/1964 | Rankin et al. | 73/67.7 |
| 3,248,933 | 5/1966 | Stebbins | 73/71.5 |
| 3,483,739 | 12/1969 | Gewartowski et al. | 73/67.8 |
| 3,485,088 | 12/1969 | O'Connor | 73/67.8 |

Primary Examiner—Richard C. Queisser
Assistant Examiner—John P. Beauchamp
Attorney—Dan R. Sadler

[57] ABSTRACT

Herein described is an ultrasonic nondestructive material tester which is useful in testing cylindrical objects, such as pipes or rods. Included in the device is a search unit, comprised of a housing which includes a pair of shoes outwardly extending therefrom, which is adapted to ride on the outside diameter of the pipe or rod. A search unit is disposed in a manner so that ultrasonic energy radiated therefrom is always normal to the outside diameter of the workpiece. A bracket is affixed to the housing and a plate is positioned parallel to the bracket and spaced therefrom. One side of the plate is coupled to the bracket by flexure. The other side of the plate is spring-coupled to the bracket. A second plate parallel to and spaced from the first plate is coupled to the first plate with a flexure on the side of the bracket ninety degrees from the first plate flexure. The second plate is spring-coupled to the first plate in a similar manner.

6 Claims, 6 Drawing Figures

Gordon H. Hatch,
INVENTOR.

Gordon H. Hatch,
INVENTOR.

Gordon H. Hatch,
INVENTOR.

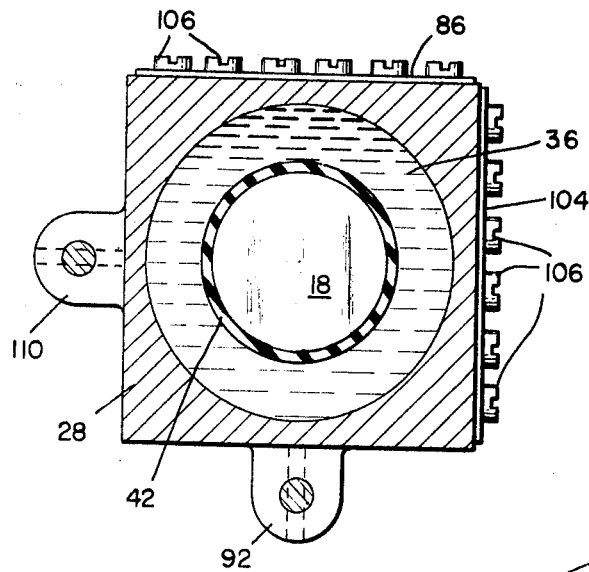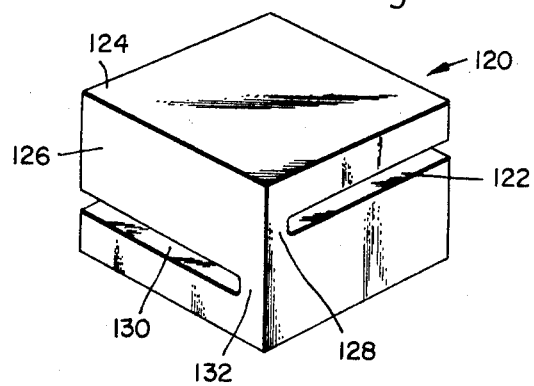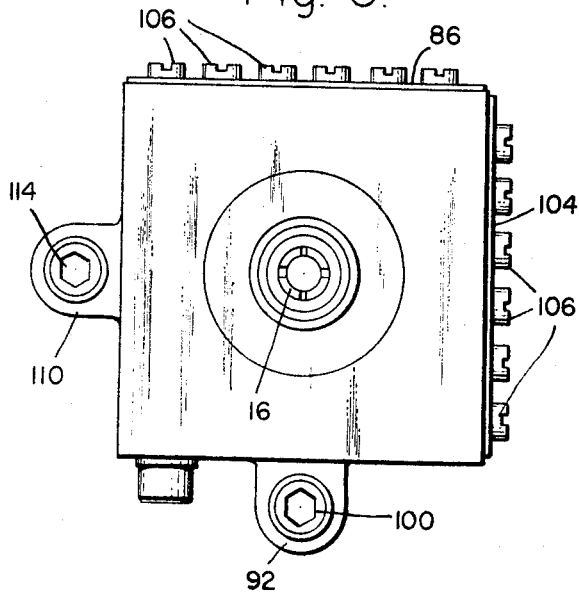

ULTRASONIC SEARCH UNIT

BACKGROUND OF THE INVENTION

A. Field of the Invention

This invention relates to nondestructive ultrasonic material testers and, more particularly, to a novel and improved search unit mounting member which is capable of floating when abutted to a cylindrical workpiece to assure that the ultrasonic radiation from the search unit enters the outside diameter of the cylindrical workpiece in a normal direction.

B. Description of the Prior Art

In the prior art there is provided electrical non-destructive test equipment which generates ultrasonic energy by use of crystal transducers. The vibrations from the transducer are sent in the form of acoustical pulse beam into the workpiece being tested. The beam travels, unimpeded, through large metallic parts and is redirected back from the end surfaces thereof. Any flaw defect or other discontinuity in the workpiece also causes deflections of the acoustical beam back to the instrument which indicates the location and size of the discontinuity on a display, such as a cathode ray display. The search unit need only access to one side of the workpiece being tested.

The pulsed high-frequency ultrasonic energy is projected from the search unit into the workpiece. A portion of the pulse is reflected back by the flaw or defect and the balance is reflected from the end surface. The return energy is displayed on the face of the cathode ray display as vertical spikes. The screen on the cathode ray display exhibits electrical wave forms in the form of spikes of the initial pulse, the defect, and the back and front surface reflections. Spacings of the spike on the display are in proportion to the distance the beam traveled in the material tested, thus locating the position of any flaw by irregular space spike. Also, such a tester is used to determine the thickness of the workpiece by the regularity of the return back and front spikes. If any discrepancy appears in the thickness, it is detected by the relative change in the spikes displayed on the scope.

In some instances it is desirous to direct the beam from the search unit directly normal to the surface of the workpiece being tested. In some circumstances if the workpiece is relatively flat, this is a relatively easy task. On the other hand, when testing cylindrical workpieces, such as pipes, rods, or the like, it is a difficult task to align the beam from the search unit to the workpiece and yet maintain this normal entrance of the ultrasonic energy therein. Many attempts have been made in the past, but all have been proven to be unsuccessful, if not virtually impossible, with a simple, relatively easy to manufacture device.

What would be particularly desirable would be a device that actually "floats" in a manner so that external adjustments need not be made when a workpiece change is made which is of a different diameter.

SUMMARY

Briefly described, the present invention comprises a nondestructive material tester which includes a novel and unique mounting apparatus for mounting a search unit to be positioned in acoustic communication with a cylindrical workpiece such as a pipe or rod.

The apparatus includes a housing having an open end and a second end disposed opposite said open end. A search unit is disposed inside the housing and is sealed therein by a frustroconical diaphragm which is imbedded against a ledge in the housing and surrounds the search unit. The housing is substantially hollow and includes a water inlet to provide a coupling between the search unit and the workpiece. The search unit, being substantially disposed from the workpiece, is coupled by the water flooding into the housing and upon the workpiece.

A bubbler tube is disposed within the housing by means of threads or the like and is positionable therein. One end of the bubbler tube is substantially funnel-shaped on its inside diameter and forms to a small opening at the open end of the housing to provide a constant stream of water over the couplant to the workpiece.

A pair of spaced, parallel bracket plates are disposed substantially adjacent to the second end of the housing and parallel thereto. The plates have openings therethrough so that the electrical cables can be connected through the openings to the search unit. A flexible member or flange connects one end of one of the plates on one side to the end of the housing. The flexible member is elongated so that it is disposed completely across one side of the housing and is coupled thereto in a suitable manner, such as screws. The other side, that is the side opposite the flexible member, is spaced apart by a spring connected to two appendages extending from the bracket members and bias the bracket members from one another. A bolt is connected through the appendages and the spring and is used to overcome the biasing tension created by the spring and the flexure member, so that the plates are substantially level to one another. The second plate, that is the one parallel to the first plate, is also connected in substantially the same manner as the first bracket member, with the exception that the flexure member thereto is on a different axis.

A pair of shoes is provided on the water outlet side of the housing, which is angled so that the apex of the angle of the shoes intersects the beam directed from the search unit. The shoes are made of a substantially hard material and ride upon the workpiece being tested.

Any irregularities or the like which cause the work-piece to become out of alignment with the search unit are normalized by the action of the X and Y flexure members heretofore described. No matter what size workpiece is inserted or any irregularities thereto, the ultrasonic energy from the search unit always enters the workpiece on an angle which is substantially normal to the outside periphery thereof.

DESCRIPTION OF THE DRAWINGS

These and other features and advantages will become more apparent to those skilled in the art when taken into consideration with the following detailed description, wherein like reference numerals indicate like and corresponding parts throughout the several views, and wherein:

FIG. 4 is a section view taken along the lines 4—4 of FIG. 3 illustrating the search unit housing within the housing;

FIG. 5 is an end view of the search unit housing of FIG. 3 illustrating the flexure members included in the present invention; and FIG. 6 is a perspective view of a further construction of the flexure members included in the present invention.

DETAILED DESCRIPTION OF THE DRAWINGS

Figure 1:
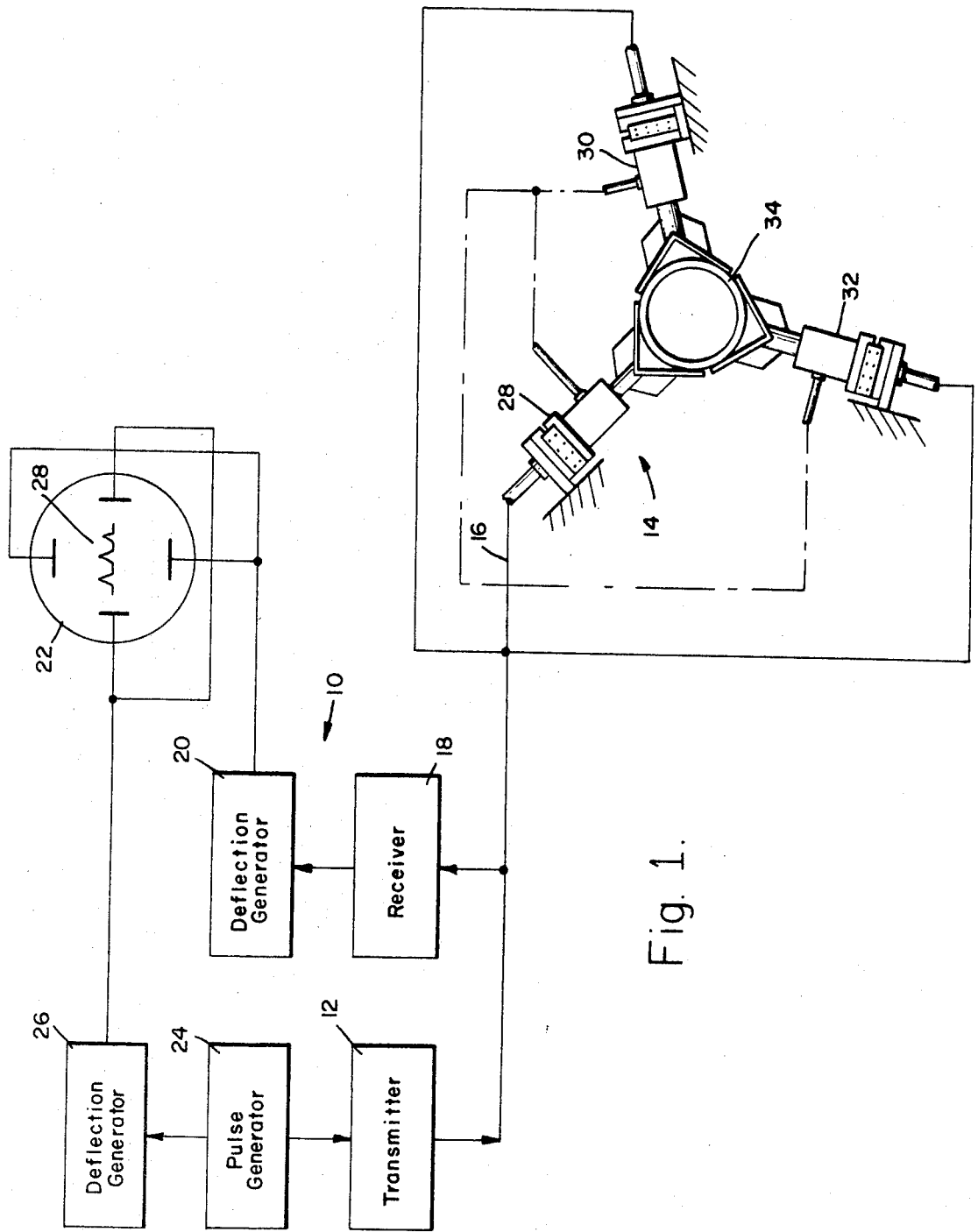
FIG. 1 is a block diagram illustrating the ultrasonic test equipment used in combination with search unit housings in accordance with this invention.

Turning now to a more detailed description of but one embodiment of this invention, there is shown in FIG. 1 a nondestructive test instrument 10 which includes a transmitter 12 which produces a series of intermitently occurring high-voltage, high-frequency pulses. The transmitter 12 is coupled to the search unit within the housing of the test apparatus, referred to generally as the numeral 14. The coupling between the test apparatus 14 and the test instrument 10 is through a cable 16. Disposed within the housing 14 is a search unit 18 shown particularly in FIG. 3 which includes an ultrasonic transducer therein which may preferrably be comprised of a piezoelectric crystal. Pulses emitted by the transmitter 12 excite the transducer in the search unit 18, whereby corresponding pulses of ultrasonic energy is transmitted therefrom.

Echoes from the pulses are received by the transducer within the search unit 18, whereby a similar electrical signal is produced therefrom. This electrical signal is returned by the cable 16 to the receiver 18. The receiver 18 is coupled to a vertical deflection generator 20, which in turn is coupled to a cathode ray tube 22. The transmitter 12 is driven by a pulse generator 24 which also drives a horizontal deflection generator 26. The horizontal deflection generator 26 and the vertical deflection generator 20 drive the cathode ray display 22.

The results of the output of the receiver 18 and the horizontal deflection generator 26 are displayed in a display 28 on the face of the cathode ray display 22. The screen of the cathode ray display 22 reflects the return energy in the form of spikes of the initial pulse. Also shown are spikes indicative of the defects and back reflections from the material under test. Spacing of the spikes is in proportion to the distance of the material tested. Any random spikes which appear between the initial spacing are indicative of flaws, defects, or other discontinuities in the workpiece being tested. Thus, the location of these flaws is identifiable by the random spikes between the initial return spikes.

The test apparatus 14 includes in this embodiment three spaced search unit housings 28, 30, and 32 which are mounted on a fixed support structure 33. By this embodiment the housings are spaced 120 degrees disposed from one another about a cylindrical workpiece 34. Typically, the workpiece 34 is shown as a hollow pipe. It is this workpiece which is desired to be inspected for flaws, defects, or other discontinuities therein, so that it may be either accepted or rejected for its intended purpose. With the angle of the housings 28, 30, and 32, 120° disposed from one another, it is desirable to have the ultrasonic energy directed from the search units therein normal to the outside peripheral surface of the workpiece 34. While three housings and accompanying search units have been shown, it should be understood that any number, or even a single search unit and housing, may be used and still remain in the spirit and scope of this invention.

Figure 2:
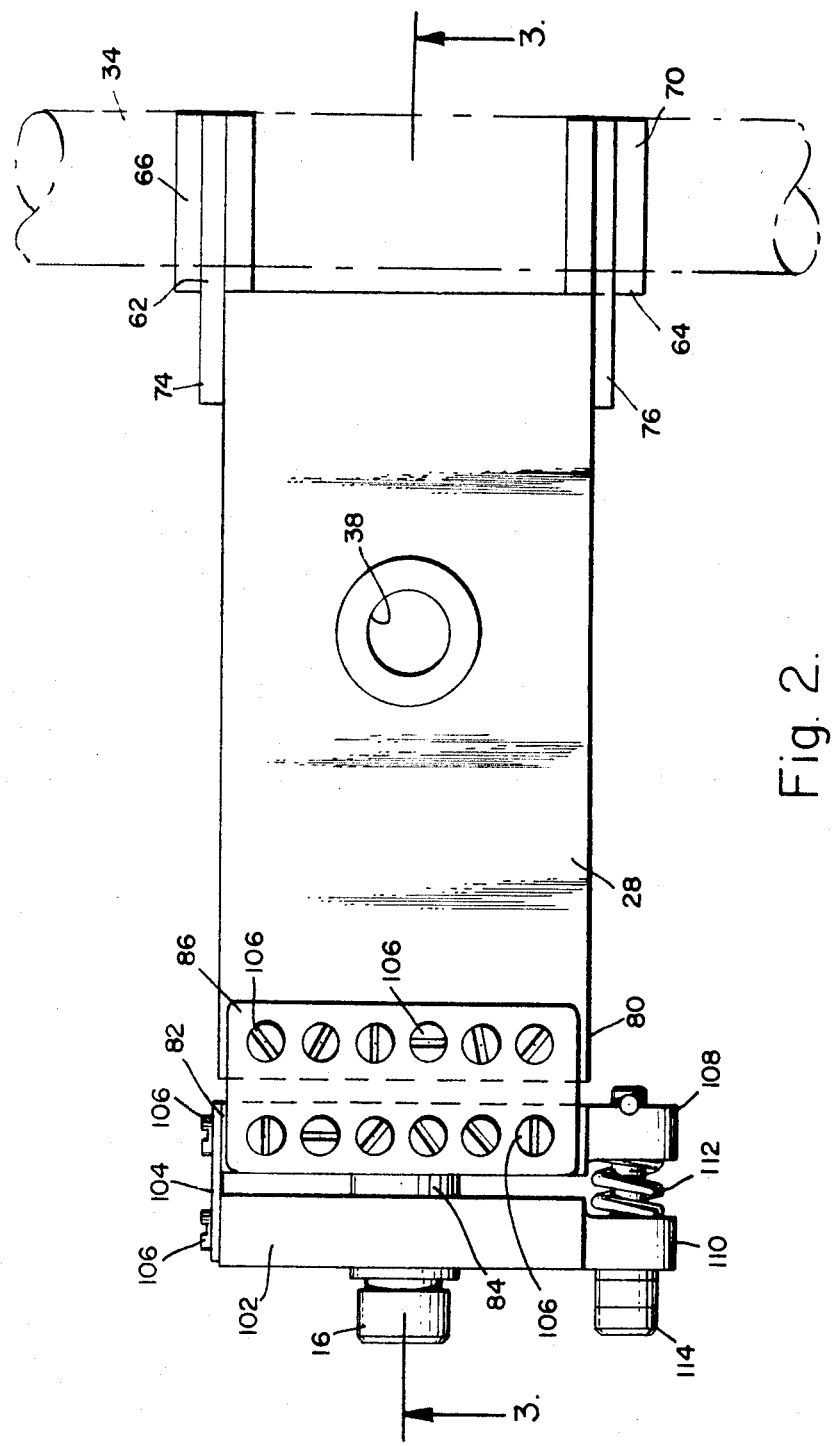
FIG. 2 is a top view of one of the search unit housings shown in FIG. 1.
Figure 3:
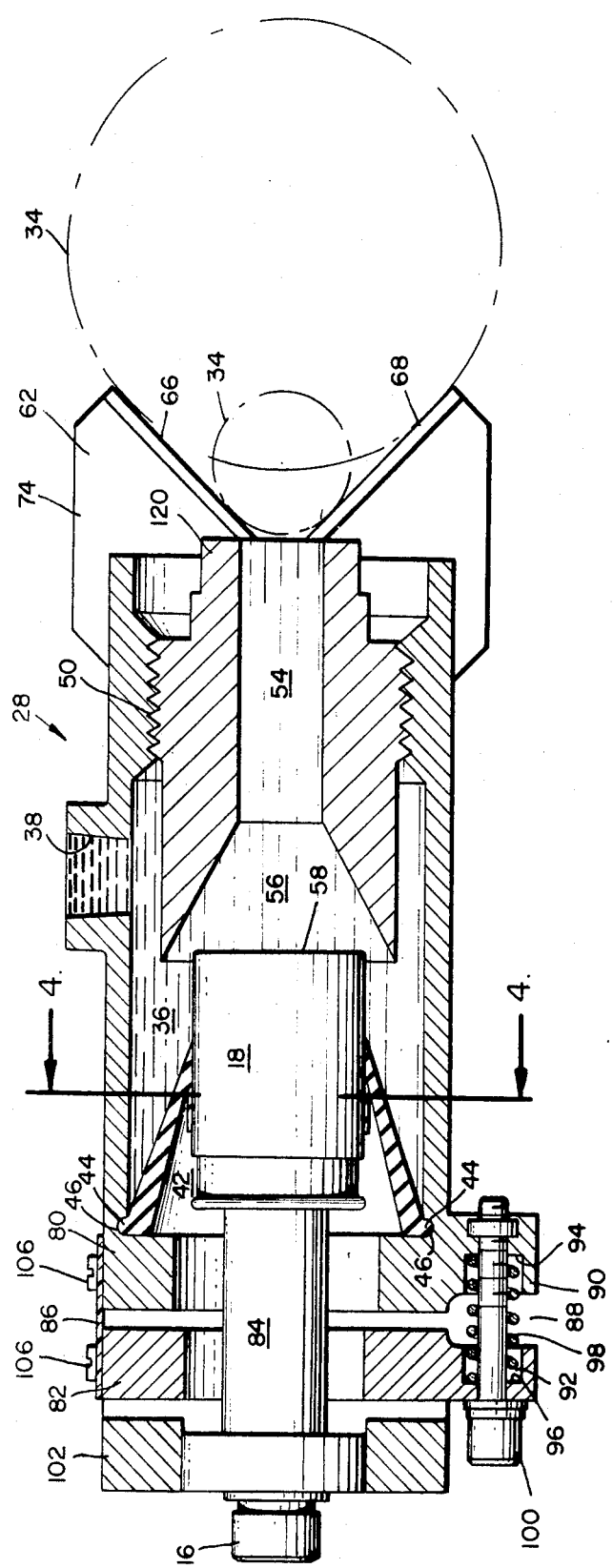
FIG. 3 is a section view of the search unit housing including the present invention taken along the lines 3—3 of FIG. 2.

Referring now to FIGS. 2 and 3, there is shown the search unit housing 28 which is substantially elongated and being rectangular shaped. The housing 28 is substantially hollow and includes a cavity 36. An opening 38 is provided on one side thereof to which a couplant inlet 40 is attached. This inlet 40 may be in the form of a hose which is coupled to a water source, for example.

Disposed within the cavity 36 of the housing 28 is a frustroconical diaphragm 42. The diaphragm 42 has a lip 44 around the periphery of the larger end thereof. This larger end is disposed adjacent to the one end of the housing 28 and is adapted to be disposed within grooves formed in the cavity 28 near the open end thereof. The diaphragm 42 being hollow is preferably comprised of a resilient material, such as rubber or the like, and includes an opening at the small end thereof. The search unit 18 is disposed into the small end of the diaphragm 42. This prevents water or other couplant within the cavity 36 from leading out of the top side of the housing 28 and substantially sealing the top end of the diaphgram 42 to the search unit 18 and the bottom end thereof to the inside of cavity 36 of the housing 28.

Still referring specifically to FIG. 3, the inside of the housing 28 may be threaded as shown by the threads 50, and a threaded bubbler tube 52 is threaded therein. The bubbler tube may, for example, have a bore 54 drilled therethrough, having one end 56 substantially funnel shaped. The end 56 is positioned adjacent to the radiating end 58 of the search unit 18, thus ultrasonic energy radiated from the search unit 18 is directed and/or focused through the bore 54 of the bubbler tube 50. Water entering the inlet hose 40 fills the cavity 56, and because of the decreased diameter 54 of the bubbler tube 52, is forced down the bore at an increased velocity, thus providing a couplant for the ultrasonic energy through the running water.

To facilitate movement of the bubbler tube 52 within the housing 28, the end of the bubbler tube may be shaped like a nut as it emerges from the housing 28. Thus a suitable wrench or the like may be placed on the nut 60 to adjust the position of the bubbler tube within the housing 28. The reason for adjustment of the bubbler tube will be more fully understood in connection with other facets of this invention as they are explained.

Referring to FIGS. 2 and 3, there is shown on the end of the housing 28 nearest the workpiece 34 two pair of shoes 62 and 64. Each pair of shoes 62 and 64 include shoe plates, whereby shoe 62 includes shoe plates 66 and 68 and shoe 64 includes shoe plates 70 and 72. The shoe plates are rectangular in shape and are comprised of a relatively hard material, for example tungsten carbide in one preferred embodiment. The shoe plates are connected to the outside of the housing 28 by suitable brackets 74 and 76 and may be secured thereto by welding or the like. The shoe plates 66 through 72 are positioned in their respective brackets to bear against the workpiece 34 as it rotates, for example. Each pair of matching shoe plates, for example 70 and 72 are angled inwardly in a V shape, where the apex of the V would intersect the focal point of the ultrasonic energy focused from the radiating end 28 of the search unit 18. This will assist in focusing the ultrasonic beam in a manner normal to the outside periphery of the workpiece 34.

Referring now to FIGS. 2 and 3 collectively, there is shown, disposed substantially parallel to the end 80 of said housing 28, a plate 82. The end 80 and plate 82 may include a hole therethrough to which the connections 84 are made to couple the cable 16 into the search unit 18. The plate 82 is spaced a short distance from end 80 and is connected thereto on two sides thereof as shown in FIG. 5. A flexure member 86 connects plate 82 to end 80 at one side thereof. The member 86 is comprised of a relatively thin, flexible material which is capable of flexing as the plate 82 is moved relative to end 80. The other side of the plate 82 and the end 80 is connected by a spring and nut-and-bolt arrangement 88 to facilitate this arrangement. A pair of appendages 90 and 92 are provided which protrude on the side opposite the flexure member 86, each having a hole therethrough aligning with each other. A pair of recesses 94 and 96 are formed into the appendages 90 and 92 respectively and face one another. A spring 98, which in this embodiment is shown as a coil spring, is disposed within the recesses 94 and 96. A nut-and-bolt 100 is disposed through the hole in the appendages 90 and 92 and through the coil of the coil spring 98.

A further plate 102 is provided parallel to the plate 82 and is connected to the plate 82 in a manner similar as the plate 82 is connected to the end 80. That is, by a flexure member 104 securing the plates 82 and 102 together by suitable bolts 106. Similar appendages 108 and 110 protrude from the plates 82 and 102 in a similar manner with a spring 112 positioned between the plates 108 and 110. A nut-and-bolt arrangement 114 couples the appendages 108 and 110 together and holds the spring 112 therebetween.

Plate 102 is normally fixed in a stationary position as shown in FIG. 1, and the workpiece 34 is designed to rotate as the inspection is performed. At times it has been found that because of irregularities and deformities of the workpiece, the rotation thereof is not in a precise manner; that is, the center line of the workpiece tends to move from one position to another. As this is done, the flexures and the spring mechanisms on the end 80 and plates 82 and 102 will allow the housing 26, and thus the search unit 18 therein, to "float" over the workpiece 34, thus assuring that the beam of ultrasonic energy radiated from the search unit 18 is always normal to the outside radius or periphery of the workpiece 34.

When a change is made from a small workpiece to a large workpiece, for example, the bubbler tube 50 is threaded outwardly so that the end 120 thereof will be extended closer to the radius of the workpiece 34 to assure the stream of water from within the cavity 36 is fed directly onto the workpiece area being tested. Likewise, when a small workpiece is used, the workpiece then is nestled closer into the shoes 62 and 64 against the plates 66 and 68 as shown in FIG. 3, for example. When this happens the bubbler tube 50 is threaded back into the housing 28 to accommodate the smaller size.

With reference now to FIG. 6 there is shown a block cut in a manner to perform the functions of the flexure members 86 and 104. Specifically, a block 120 comprised of a resilient hard plastic, for example, has a first cut 122 therein. Cut 122 is horizontal or on the plane parallel to side 124. This cut 122 ends before it reaches side 126, so that a thin strip 128 remains intact which then functions as a flexure. A similar cut 130 is cut parallel to cut 122, except cut on a different axis. This cut 130 leaves a thin strip 132 to act as a further flexure member. While not shown in FIG. 6, similar appendages, bolt and spring arrangements, are provided to complete the apparatus.

The flexure block 120 operates in a manner similar to the flexure members 86 and 104 previously described but may be easier in manufacture and thus less expensive, because of the single price construction. If proper materials are selected, then the flexibility of the thin strips 128 and 132 would cause the housing 28 to float in accordance with the principles aforesaid.

Having thus described one preferred embodiment of this invention, what is claimed is:

1. A search unit mounting apparatus for positioning an ultrasonic search unit in communication with a moving workpiece, said apparatus including
   a housing having a first end adapted to follow the workpiece and a second end remote from the first end,
   a passage extending axially through said housing, said passage forming an opening in said first end aligned with the workpiece,
   first and second supports movably disposed adjacent said housing,
   first and second flexible connections between said first and second supports and the housing, said first flexible connection being resiliently bendable about a first axis at substantially right angles to the axis of the housing and the passage therethrough, said second flexible connection being resiliently bendable about a second axis at substantially right angles to said preceding axes, and
   an ultrasonic search unit mounted on said second support and extending into said passage, said search unit being movable within the housing and adapted to scan said workpiece as the first end thereof moves over the workpiece.

2. The apparatus of claim 1 including
   a pair of shoes on said housing for maintaining said first end adjacent said workpiece and said passage aligned with the workpiece while said workpiece is rotating.

3. The apparatus of claim 1 wherein
   the search unit is adapted to transmit and receive ultrasonic energy, and
   the housing includes means for maintaining said passage full of an ultrasonic couplant.

4. The apparatus of claim 1 including
   means in the search unit for transmitting and receiving ultrasonic energy, and
   means on said housing for circulating an ultrasonic couplant into the passage for maintaining the passage full of said couplant.

5. The apparatus of claim 4 including
   a resilient boot disposed concentrically about the search unit and attached to the housing, said boot being effective to seal the second end of said passage against the loss of said couplant.

6. The apparatus of claim 5 wherein
   the first and second flexible connections are leaf springs which are resiliently bendable in directions normal to the plane thereof.

* * * * *